United States Patent
Manfred et al.

(10) Patent No.: US 8,068,943 B2
(45) Date of Patent: Nov. 29, 2011

(54) INERTIAL SIGNALS FOR FLIGHT CONTROL BACKUP MODE

(75) Inventors: Mark Manfred, Edina, MN (US); Tom Ryno, Andover, MN (US); Mark E. Wright, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 627 days.

(21) Appl. No.: 11/773,101

(22) Filed: Jul. 3, 2007

(65) Prior Publication Data

US 2009/0216391 A1    Aug. 27, 2009

(51) Int. Cl.
*G01C 23/00* (2006.01)

(52) U.S. Cl. ............. 701/3; 701/14; 244/75.1; 244/76 R

(58) Field of Classification Search ................ 701/3, 14, 701/29, 33; 244/76 R, 221, 228, 99.2, 99.4, 244/99.9

See application file for complete search history.

(56) References Cited

U.S. PATENT DOCUMENTS

| | | | |
|---|---|---|---|
| 4,744,532 A * | 5/1988 | Ziegler et al. | 244/78.1 |
| 6,909,948 B2 * | 6/2005 | Mollmann et al. | 701/29 |
| 7,302,316 B2 * | 11/2007 | Beard et al. | 701/11 |
| 7,337,044 B2 * | 2/2008 | Platzer et al. | 701/3 |
| 2003/0137433 A1 * | 7/2003 | Schiller et al. | 340/973 |
| 2005/0192747 A1 * | 9/2005 | Schiller et al. | 701/220 |
| 2006/0058928 A1 * | 3/2006 | Beard et al. | 701/11 |
| 2006/0100750 A1 * | 5/2006 | Platzer et al. | 701/3 |
| 2007/0164168 A1 * | 7/2007 | Hirvonen et al. | 244/223 |

* cited by examiner

*Primary Examiner* — Jack Keith
*Assistant Examiner* — Rami Khatib
(74) *Attorney, Agent, or Firm* — Fogg & Powers LLC

(57) ABSTRACT

A flight control system is provided that includes a reference system and flight control actuators. The reference system includes one or more sets of gyroscopes and accelerometers. At least one set of the gyroscopes and accelerometers are configured to provide a first output of a first set inertial signals for normal mode flight control and second output of a second different set of inertial signals for backup mode flight control. The flight control actuators are configured to be controlled by one of the first set of inertial signals and the second set of inertial signals.

19 Claims, 3 Drawing Sheets

INERTIAL SIGNALS FOR FLIGHT CONTROL BACKUP MODE

BACKGROUND

It is common in aircraft with Fly-By-Wire (FBW) Flight Control Systems that they are designed to protect against both random failures and design errors. Protection against random failures is generally achieved by using redundant channels of equipment. The flight control system generally provides a normal mode that uses redundant channels of inertial signals, such as provided by a micro electromechanical system (MEMS) attitude and heading reference systems (AHRS) or an Inertial Reference System (IRS). Each AHRS or IRS has three gyroscopes and three accelerometers and a microprocessor with software to calculate a full complement of inertial signals. The complexity of the microprocessor and software causes such signals to be susceptible to hardware or software errors, and they are generally considered to be not fully analyzable for design errors.

Protection against design errors is generally achieved by augmenting the flight control normal mode with a simpler backup mode that can be activated in the event of a design error in the normal mode. The backup mode requires a subset of inertial signals (generally only body rate signals) that are simpler in design and hence are fully analyzable against design errors. The inertial signals for the backup mode generally have relaxed accuracy requirements compared to the signals for the normal mode. The backup mode inertial sensors are also generally redundant to protect against random failures. This means the flight control system requires duplicate sets of redundant inertial sensors—one set for the normal mode and another set for the backup mode. This duplication of inertial sensors increases the cost of the flight control system.

For the reasons stated above and for other reasons stated below which will become apparent to those skilled in the art upon reading and understanding the present specification, there is a need in the art for an effective and efficient control signal system.

SUMMARY OF INVENTION

The above-mentioned cost of requiring duplicate sets of inertial sensors are addressed by embodiments of the present invention and will be understood by reading and studying the following specification. The following summary is made by way of example and not by way of limitation. It is merely provided to aid the reader in understanding some of the aspects of the invention.

In one embodiment, a flight control system is provided. The system includes a reference system and flight control actuators. The reference system includes one or more sets of gyroscopes and accelerometers. At least one set of the gyroscopes and accelerometers are configured to provide a first output of a first set inertial signals for normal mode flight control and second output of a second different set of inertial signals for backup mode flight control. The flight control actuators are configured to be controlled by one of the first set of inertial signals and the second set of inertial signals.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
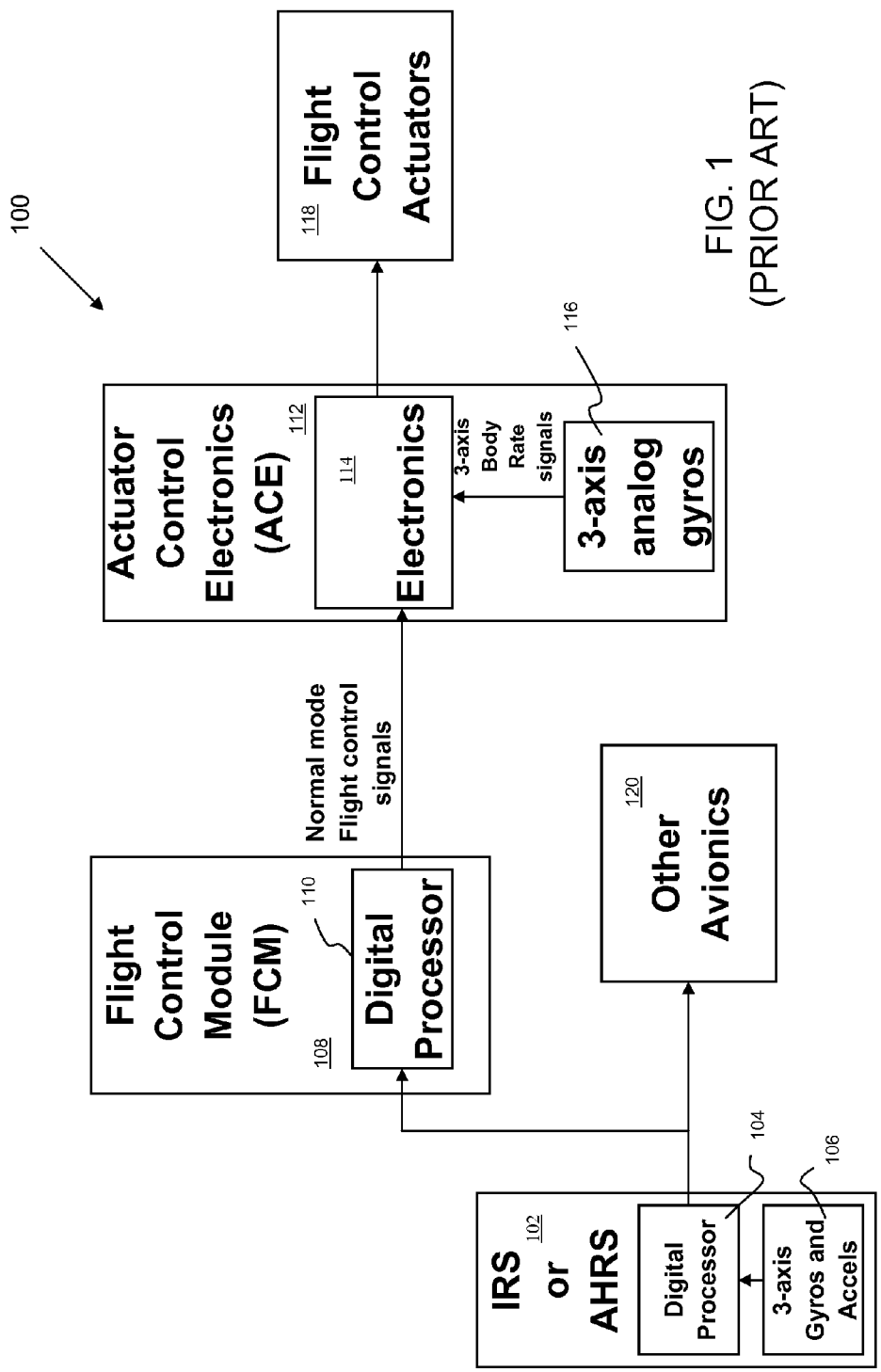
FIG. 1 is a block diagram of a flight control system of the prior art. For simplicity, the Figure does not show the redundancy within the flight control channels.

Embodiments of the present invention provide a system that uses the same set of gyroscopes to provide inertial signals for both the normal flight control mode and for the backup flight control mode. To provide further background, prior art flight control system 100 is illustrated in the block diagram of FIG. 1. For simplicity, FIG. 1 does not show the redundancy required to protect against random failures. As illustrated, the flight control system 100 includes an inertial reference system (IRS) or attitude and heading reference system (AHRS) 102. The IRS or AHRS can generally be referred to as a reference system (RS). The RS 102 includes a first set of 3 axis gyroscopes and accelerometers 106. The first set of gyroscopes and accelerometers 106 provide a first set of inertial signals that are communicated to a digital processor 104. Digital processor 104 processes these gyroscope and accelerometer signals to provide a full complement of inertial signals with optimal accuracy. The RS signals are communicated to the flight control module (108) as well as other avionic systems 120 of the flight control system 100. The FCM includes digital processor 110 that processes the RS signals and other control signals into normal mode flight control signals. The normal mode flight control signals are communicated to the control electronics 114 of the actuator control electronics (ACE) 112. As illustrated, the control electronics 114 of the ACE 112 generates actuator control signals based on the normal mode flight control signals to control the flight control actuator 118 via actuator control signals. Further illustrated in FIG. 1, is another 3-axis gyroscope 116 that provides 3-axis body rates signals to the electronics 114. The electronics 114 use the normal mode control signals from FCM 108 when in normal flight mode and the body rate signals from analog gyro 116 when in backup (or direct) flight mode. Hence, the prior art uses two sets of gyroscopes in their flight control system.

Figure 2:
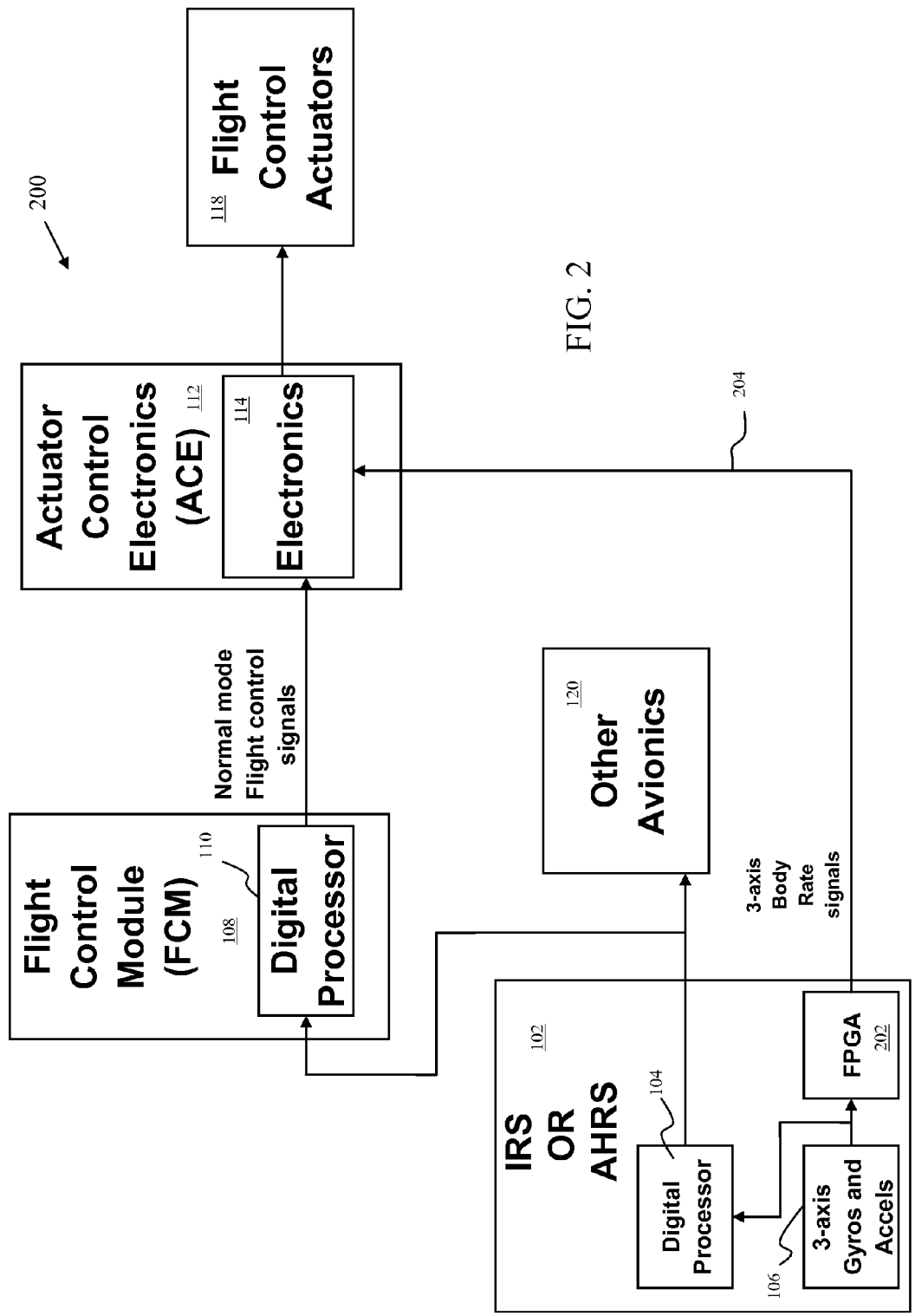
FIG. 2 is a block diagram of a flight control system of one embodiment of the present invention. For simplicity, the Figure does not show the redundancy within the flight control channels.

Referring to FIG. 2, one embodiment of a flight control system 200 of the present invention is illustrated. As illustrated, flight control system 200 also includes an IRS or AHRS 102, other avionics 102, FCM 108, ACE 112 and flight control actuator 118. However, in this embodiment, only one set of gyroscopes 106 is used. As illustrated, in this embodiment, the ACE 112 does not include a second set of gyroscopes. Signals from gyroscope 106 are communicated to the digital processor 104 as discussed above that uses software to provide a full complement of highly accurate inertial signals for the flight control normal mode. Signals from gyroscope 106 are also communicated to a firmware device such as a field programmable gate array (FPGA) 202 in RS 102. The FPGA 202 uses relatively simple and fully analyzable hardware to improve the accuracy of the inertial signals through relatively simple compensation techniques, such as temperature compensation. The FPGA 202 converts the inertial signals to 3-axis body rate signals that are communicated to the electronics 114 in the ACE 112. Hence, the same gyroscopes 106 produce inertial signals for both the normal flight control mode and the backup flight control mode. The signals for the normal flight control mode pass from gyros 106 into the digital processor 104 in the RS 102 and then to the digital processor 110 in the FCM and then to the electronics 114. The signals for the backup flight control pass from gyros 106 to the FPGA 202 and then directly to the analog electronics.

Figure 3:
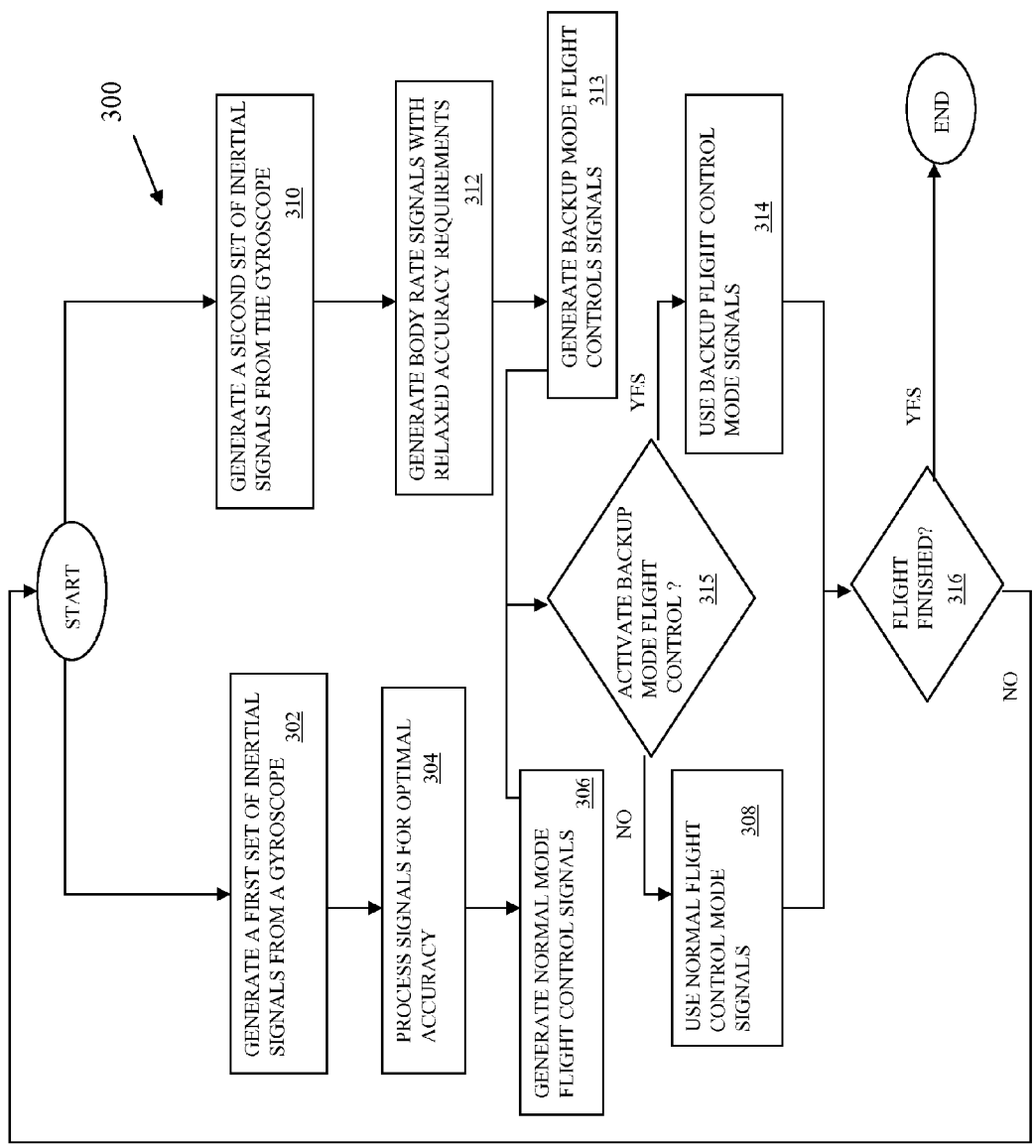
FIG. 3 is a flow diagram illustrating the implementation of one embodiment of the present invention.

In FIG. 3, a flight control flow diagram 300 of one embodiment is illustrated. As illustrated, a first set of inertial signals are generated by gyroscopes and accelerometers 302. The first set of inertial signals includes a full complement of AHRS signals. The full complement of AHRS signals in the first set of inertial signals are processed for optimal accuracy (304). Normal mode flight controls are generated from the processed AHRS signals. A second set of inertial signals is generated by the same gyroscopes and accelerometers (310). From the second set of signals, body rate signals with relaxed accuracy requirements are generated (312). From the relaxed body rate signals, backup mode flight control signals are generated (313).

As the flight control diagram 300 illustrates in this embodiment, once the normal mode flight controls signals and the backup flight mode flight controls signals have been generated (306 and 313), it is then determined if the backup mode flight control is to be used (315). If the backup mode flight control is not to be used (315), the normal mode flight control signals are used (308). If the backup mode flight control is activated (315), the backup mode flight control signals are used (314). It is then determined if the flight is finished (316). If the flight has finished (316), the process ends. If the flight has not finished (316), the process continues with the generation of first and second inertial signals at (302) and (310) respectively.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A flight control system, the system comprising:
 a reference system including a first set of gyroscopes and accelerometers configured to provide a first output of a first set of inertial signals and a second output of 3-axis body rate signals based on the gyroscopes of the first set;
 a flight control module coupled to the reference system and receiving the first output of inertial signals, the flight control module processing the first set of inertial signals into normal mode flight control signals;
 actuator control electronics having a first input receiving the normal mode flight control signals and a second input receiving the second output of 3-axis body rate signals; and
 flight control actuators coupled to the actuator control electronics, wherein the actuator control electronics selects the normal mode flight control signals to control the flight control actuators while operating in a normal flight mode, and wherein the actuator control electronics selects the 3-axis body rate signals to control the flight control actuators while operating in a backup flight mode.

2. The system of claim 1, further comprising:
 a field programmable gate array (FPGA) configured to convert the first set of inertial signals to the 3-axis body rate signals.

3. The system of claim 2, further comprising:
 control electronics configured to convert the 3-axis body rates signals to actuator signals to control the flight control actuators.

4. The system of claim 1, further comprising:
 at least one processor configured to process the first set of inertial signals for optimal accuracy and convert the optimal accuracy signals to normal mode flight control signals.

5. The system of claim 4, further comprising:
 control electronics configured to convert the normal mode flight control signals to actuator signals to control the flight control actuators.

6. A flight control system, the system comprising:
 one or more sets of 3-axis gyroscopes, at least one set of 3-axis gyroscopes configured to generate a first output of a first set of inertial signals and second output of 3-axis body rate signals;
 flight control actuators to control steering of an aircraft; and
 actuator control electronics (ACE) in communication with the gyroscopes and the flight control actuators, the ACE configured to selectively generate actuator control signals to control the flight control actuators, wherein the actuator control electronics selects normal mode flight control signals generated from the first output of the first set of inertial signals to control the flight control actuators while operating in a normal flight mode, and wherein the actuator control electronics selects the second output of 3-axis body rate signals to control the flight control actuators while operating in a backup flight mode.

7. The system of claim 6, further comprising:
 a field programmable gate array (FPGA) configured to convert the first set of inertial signals to the 3-axis body rate signals.

8. The system of claim 7, wherein the ACE includes analog electronics configured to convert the 3-axis body rates signals to actuator signals to control the flight control actuators.

9. The system of claim 6, further comprising:
 a reference system (RS) processor configured to convert the first set of inertial signals to RS signals; and
 a flight control module (FCM) to convert the RS signal to normal mode flight control signals, wherein the ACE converts the RS signals into actuator signals to control the flight control actuators.

10. The system of claim 9, wherein the FCM further comprises:
 a FCM processor configured to convert the RS signals to the normal mode flight control signals.

11. The system of claim 6, wherein the ACE further comprises:
analog electronics configured to selectively generate actuator control signals based on the first set of inertial signals or the 3-axis body rate signals.

12. A method of controlling the flight of an aircraft, the method comprising:
generating a first set of inertial signals from gyroscopes and accelerometers within a device;
generating a set of body rate signals from said gyroscopes within the device;
during normal flight mode, using the first set of inertial signals to control flight control actuators of the aircraft; and
during backup flight mode, using the set of body rate signals to control the flight control actuators of the aircraft.

13. The method of claim 12, wherein the device includes at least three axes of gyroscopes and three axes of accelerometers.

14. The method of claim 12, further comprising:
generating actuator control signals from the set of body rate signals to control the flight control actuators during the backup flight mode.

15. The method of claim 12, further comprising:
processing the first set of inertial signals for optimal accuracy.

16. The method of claim 15, further comprising:
using the processed optimal accuracy inertial signals for other avionics of the aircraft.

17. The method of claim 15, further comprising:
generating normal mode flight control signals from the processed optimal accuracy inertial signals.

18. The method of claim 17, further comprising:
generating actuator control signals from the normal mode flight control signals during the normal flight mode.

19. The method of claim 12, further comprising:
determining if a backup flight mode should be used.

* * * * *